(12) United States Patent
Bjoerklund et al.

(10) Patent No.: US 9,800,344 B2
(45) Date of Patent: Oct. 24, 2017

(54) SUBSEA DATA TRANSMISSION CABLE

(71) Applicant: Siemens Aktiengesellschaft, Munich (DE)

(72) Inventors: Morten Bjoerklund, Kongsberg (NO); Trond Holger Villmark, Kongsberg (NO)

(73) Assignee: SIEMENS AKTIENGESELLSHAFT, Munich (DE)

( * ) Notice: Subject to any disclaimer, the term of this patent is extended or adjusted under 35 U.S.C. 154(b) by 0 days.

(21) Appl. No.: 15/139,397

(22) Filed: Apr. 27, 2016

(65) Prior Publication Data

US 2016/0365927 A1    Dec. 15, 2016

(30) Foreign Application Priority Data

Jun. 9, 2015    (EP) ..................................... 15171119

(51) Int. Cl.
    *H04B 10/29*    (2013.01)
    *H04B 3/36*    (2006.01)
    (Continued)

(52) U.S. Cl.
    CPC ............. *H04B 10/29* (2013.01); *H02G 15/10* (2013.01); *H02G 15/14* (2013.01); *H04B 3/36* (2013.01); *H04B 3/52* (2013.01)

(58) Field of Classification Search
    CPC . H04B 3/36; H04B 3/52; H04B 10/29; H02G 15/14; H02G 15/10
    See application file for complete search history.

(56) References Cited

U.S. PATENT DOCUMENTS 8,634,690 B2    1/2014    Landaas
8,734,026 B2    5/2014    Nagengast
(Continued)

FOREIGN PATENT DOCUMENTS

EP    12186843    4/2012
EP    2713191 A1    4/2014
(Continued)

OTHER PUBLICATIONS

Extended European Search Report dated Dec. 21, 2015.
Search Report for corresponding European Search Application No. EP15171119 dated Dec. 21, 2015.

*Primary Examiner* — Shi K Li
*Assistant Examiner* — Mina Shalaby
(74) *Attorney, Agent, or Firm* — Harness, Dickey & Pierce, P.L.C.

(57) ABSTRACT

A subsea data transmission cable for providing data communication with a subsea device installed at the ocean floor is provided. The subsea data transmission cable includes a first section including at least one electrical data line and a second section including at least one fiber optic data line. An intermediate conversion assembly is provided. The at least one electrical data line and the at least one fiber optic data line are terminated at the intermediate conversion assembly. A conversion device is disposed in a chamber of the intermediate conversion assembly. The conversion device includes an electrical interface connected to the at least one electrical data line and an optical interface connected to the at least one fiber optic data line. The conversion device is configured to convert an electrical data signal received at the electrical interface to an optical data signal for transmission via the optical interface and vice versa.

25 Claims, 5 Drawing Sheets

(51) Int. Cl.
    *H04B 3/52*    (2006.01)
    *H02G 15/10*   (2006.01)
    *H02G 15/14*   (2006.01)

(56) References Cited

U.S. PATENT DOCUMENTS

| | | |
|---|---|---|
| 2013/0044983 A1 | 2/2013 | Nagengast et al. |
| 2013/0307699 A1 | 11/2013 | Brekke et al. |
| 2014/0093247 A1* | 4/2014 | Jamtveit .................. F16L 1/12 398/104 |
| 2015/0003916 A1 | 1/2015 | Rico Rubio et al. |

FOREIGN PATENT DOCUMENTS

| | | |
|---|---|---|
| EP | 2793333 A1 | 10/2014 |
| WO | WO-2012041535 A1 | 4/2012 |
| WO | WO 2012051063 A1 | 4/2012 |

* cited by examiner

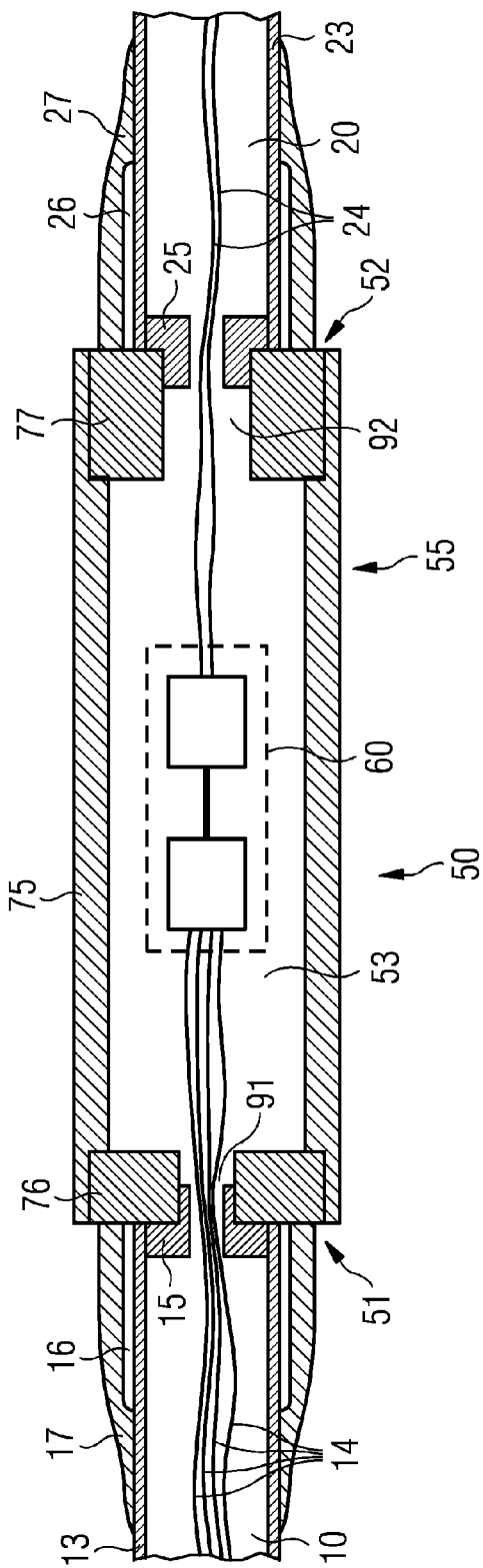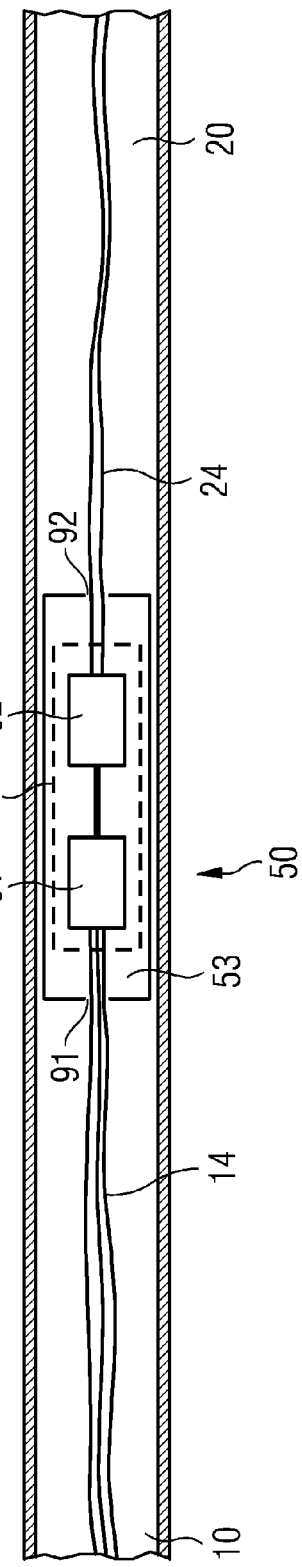
FIG 5
FIG 6

SUBSEA DATA TRANSMISSION CABLE

PRIORITY STATEMENT

The present application hereby claims priority under 35 U.S.C. §119 to European patent application number EP 15171119.9 filed Jun. 9, 2015, the entire contents of which are hereby incorporated herein by reference.

FIELD

At least one embodiment of the invention generally relates to a subsea data transmission cable for providing data communication with a subsea device installed at the ocean floor. In particular, it relates to a subsea data transmission cable comprising a pressure compensated liquid filled hose.

BACKGROUND

Due to the increasing energy demands, offshore oil and gas production is moving into deeper waters. For ensuring an efficient and secure production, processing facilities are being installed at the ocean floor. Such subsea installations can comprise a range of components, including pumps, compressors and the like as well as a power grid for operating them. The power grid may for example comprise a subsea transformer, subsea switchgear and subsea variable speed drives. The components of the subsea installation need to be protected from the surrounding sea water, in which pressures of 300 bar or more can prevail (at installation depths of 3.000 m or more).

Components of such subsea installation can comprise electronic equipment that can be monitored and/or controlled from a topside installation, such as a topside control system which may be located on a fixed or floating vessel, in particular on a ship or a platform, or may be based onshore. The subsea installation can for example comprise one or more subsea control modules (SCM) which may receive commands from the topside installation or which may transmit information to the topside installation, which may communicate with each other or which may interface a sensor. In other installations, data communication is to be performed with sensors of a valve tree or other subsea equipment.

In such systems, communication links may for example be required between the sensors and a subsea control modules or a topside installation, between subsea control modules and a topside installation, or between different subsea control modules. Communication can be implemented by way of a network communication, such as Ethernet. Although such type of communication link can achieve relatively high bandwidth, e.g. 10 Mbps, 100 Mbps or even 1 Gbps, such types of communication links are limited in their physical length. As an example, Ethernet based on a twisted copper wire pair has a limited length of about 100 m according to Ethernet standards. Enhanced solutions may achieve distances exceeding 150 meters length of the communication link. In general, communication using such type of technology is thus limited to subsea control modules of the same valve tree. A communication between different valve trees is usually not possible, each installation requiring their own link to a topside installation via an umbilical or the like.

To overcome this problem, the use of fiber optic transmission is known. Yet fiber optic transmission cables also require respective optical connectors. In particular wet-mateable optical connectors that can be connected and disconnected in the subsea environment are complex and expensive.

To decrease the complexity and increase the reliability, a solution is proposed in the document EP 2713191 A1. An electrical connector is provided that converts an optical signal from a fiber optic transmission line into an electrical signal to allow the establishing of an electrical connection with a wet-mateable electrical connector for data transmission.

Although such solution provides significant advantages, the resulting connector is relatively large and bulky. This can make the connector difficult to handle for a remotely operated vehicle (ROV). Further, significant forces act on the connector and its components due to the increased weight of the connector and from the cable connected thereto. This can be detrimental to such connectors. Also, the structure to which the connector is connected may generate vibrations, for example a subsea pump or a subsea compressor. Such vibrations affect all parts of the connector, and also the conversion part including the optical components. Further, such vibrations in combination with the added weight can cause damage to the connector or some of its components.

SUMMARY

The inventores have discovered that it is desirable to extend the distance over which subsea communication can occur, while maintaining a high bandwidth. In particular, they have discovered that it is desirable to enable communication between different valve trees, or between a subsea installation and an onshore site at high bandwidth. At the same time, they have discovered that it is desirable to keep system complexity relatively low and to limit the complexity that is added to the system. Also, they have discovered that it would be beneficial to be able to connect and disconnect such communication links under water while keeping maintenance low and reliability high. They have discovered that damage to the components should be prevented and the lifetime of such communication links should be improved.

Accordingly, the inventors have discovered that there is a need of providing improved communication links for subsea installations, and in particular to improve the reliability and lifetime of such communication links while maintaining the complexity relatively low.

The claims describe embodiments of the invention.

According to an embodiment of the invention, a subsea data transmission cable for providing data communication with a subsea device installed at the ocean floor is provided. The subsea data transmission cable comprises a first subsea cable section comprising at least one electrical data line, a second subsea cable section comprising at least one fiber optic data line, and an intermediate conversion assembly. One end of the first subsea cable section is terminated to the intermediate conversion assembly and one end of the second subsea cable section is terminated to the intermediate conversion assembly.

The intermediate conversion assembly comprises a subsea housing, a sealed chamber provided in the subsea housing, a first termination assembly that terminates at least an outer sheath of the first subsea cable section and a second termination assembly that terminates at least an outer sheath of the second subsea cable section. A penetrator assembly is configured to provide an electrical connection from within the sealed chamber to the at least one electrical data line and to provide an optical connection from within the sealed chamber to the at least one fiber optic data line. The intermediate conversion assembly further comprises a conversion device disposed in the sealed chamber. The conversion device has an electrical interface to which the at least one electrical data line is connected and an optical interface to which the at least one fiber optic data line is connected. The conversion device is configured to convert an electrical data signal received at the electrical interface to an optical data signal for transmission via the optical interface, and to convert an optical data signal received at the optical interface to an electrical data signal for transmission via the electrical interface.

According to a further embodiment of the invention, a subsea data transmission cable for providing data communication with a subsea device installed at the ocean floor is provided. The subsea data transmission cable comprises a first subsea cable section comprising at least one electrical data line, a second subsea cable section comprising at least one fiber optic data line, and an intermediate conversion assembly. The at least one electrical data line and the at least one fiber optic data line are terminated to the intermediate conversion assembly. At least one of the first subsea cable section and the second subsea cable section is provided by a liquid filled hose that is pressure compensated against the ambient environment, for example by a pressure balanced oil filled (PBOF) hose.

The intermediate conversion assembly comprises a chamber sealed to the environment outside the subsea data transmission cable, the chamber being filled with a liquid, an electrical feedthrough for leading an electrical connection to the at least one electrical data line into the chamber and an optical feedthrough for leading an optical connection to the at least one fiber optic data line into the chamber. A conversion device is disposed in the chamber. The conversion device has an electrical interface to which the at least one electrical data line is connected and an optical interface to which the at least one fiber optic data line is connected. The conversion device is configured to convert an electrical data signal received at the electrical interface to an optical data signal for transmission via the optical interface, and to convert an optical data signal received at the optical interface to an electrical data signal for transmission via the electrical interface.

The intermediate conversion assembly further comprises a pressure equalizing component that provides a pressure balancing between the inside of the chamber and the inside of the liquid filled hose, so that when the subsea data transmission cable is deployed subsea, the pressure applied by the ambient environment to the liquid filled hose is transmitted via the pressure equalizing component into the chamber.

A further embodiment of the invention relates to an intermediate conversion assembly itself, without the first and second subsea cable sections, having any of the above outlined configurations.

BRIEF DESCRIPTION OF THE DRAWINGS

The forgoing and other features at advantages of the invention will become further apparent from the following detailed description read in conjunction with the accompanying drawings. In the drawings, like reference numerals refer to like elements.

FIG. 5 is a schematic drawing showing a sectional side view of an intermediate conversion assembly according to a further embodiment of the invention.

FIG. 6 is a schematic drawing showing a sectional side view of an intermediate conversion assembly according to a further embodiment of the invention.

DETAILED DESCRIPTION OF THE EXAMPLE EMBODIMENTS

Figure 1:
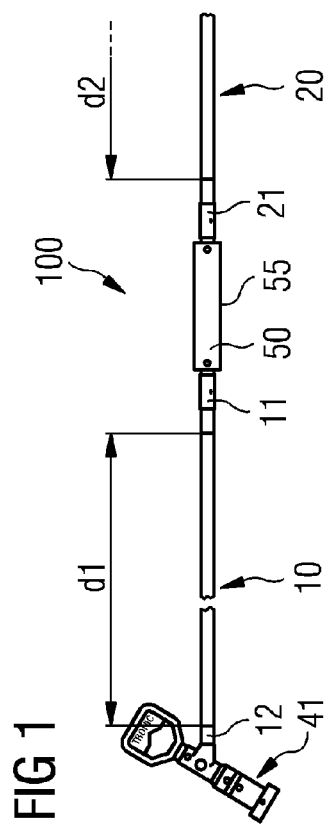
FIG. 1 is a schematic drawing showing a subsea data transmission cable according to an embodiment of the invention.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In the following, embodiments of the invention are described in detail with reference to the accompanying drawings. It is to be understood that the following description of the embodiments is given only for the purpose of illustration and is not to be taken in a limiting sense. It should be noted that the drawings are to be regarded as being schematic representations only, and elements in the drawings are not necessarily to scare with each other. Rather, the representation of the various elements is chosen such that their function and general purpose become apparent to a person skilled in the art.

According to an embodiment of the invention, a subsea data transmission cable for providing data communication with a subsea device installed at the ocean floor is provided. The subsea data transmission cable comprises a first subsea cable section comprising at least one electrical data line, a second subsea cable section comprising at least one fiber optic data line, and an intermediate conversion assembly. One end of the first subsea cable section is terminated to the intermediate conversion assembly and one end of the second subsea cable section is terminated to the intermediate conversion assembly.

The first cable section and/or the second cable section may in some embodiments be a liquid filled hose that is pressure compensated against the ambient environment, such as a pressure balanced oil filled (PBOF) hose.

The intermediate conversion assembly comprises a subsea housing, a sealed chamber provided in the subsea housing, a first termination assembly that terminates at least an outer sheath of the first subsea cable section and a second termination assembly that terminates at least an outer sheath of the second subsea cable section. A penetrator assembly is configured to provide an electrical connection from within the sealed chamber to the at least one electrical data line and to provide an optical connection from within the sealed chamber to the at least one fiber optic data line. The intermediate conversion assembly further comprises a conversion device disposed in the sealed chamber. The conversion device has an electrical interface to which the at least one electrical data line is connected and an optical interface to which the at least one fiber optic data line is connected. The conversion device is configured to convert an electrical data signal received at the electrical interface to an optical data signal for transmission via the optical interface, and to convert an optical data signal received at the optical interface to an electrical data signal for transmission via the electrical interface.

By providing such subsea data transmission cable, it becomes possible of using a standard electrical connection at the other end of the first subsea cable section, such as a wet mateable electrical connector or a direct connection into a subsea device, while allowing the transmission of data at relatively high bandwidths and transmission rates over long distances by making use of the fiber optic data line provided in the second subsea cable section. By providing the intermediate conversion assembly between the first subsea cable section and the second subsea cable section, it becomes possible to use a standard electrical connector at the other end of the first subsea cable section without any added weight or size.

Accordingly, providing an electrical connection subsea via an ROV will be facilitated. Furthermore, such subsea data transmission cable may achieve a higher reliability and prolonged life time.

As an example, vibrations which may occur at the device towards which the other end of the first subsea cable section is connected, either directly or via a wet mateable connector, will not be transmitted to the intermediate conversion assembly due to the intervening first subsea cable section. The risk of damaging the intermediate conversion assembly may thus be reduced, thereby increasing the lifetime of the subsea data transmission cable and the respective communication link. Even further, such subsea data transmission cable allows the use of different types of cables for the first subsea cable section and the second subsea cable section. As an example, a relatively flexible cable section may be used for the first subsea cable section, such as a pressure balanced oil filled hose, and a robust and stiffer subsea cable that is not pressure balanced may be used for the second subsea cable section. By such configuration, a data transmission in excess of 1,000 m may be achieved. Since the subsea data transmission cable may be deployed similar to a standard communication cable, the installation may further be facilitated.

According to an embodiment, the chamber is a pressure resistant chamber that is configured to maintain a predetermined internal pressure inside the chamber when the subsea data transmission cable is deployed subsea. In particular, it may be configured to maintain a pressure below 5 bar inside the chamber. The chamber may be filled with a gas, for example with air, with nitrogen, or the like. Standard electric and electronic components, as well as optical components may thus be used within the chamber.

The chamber may have a first end wall towards the first termination assembly and a second end wall towards the second termination assembly. The penetrator assembly may comprise an electrical penetrator arranged in an opening of the first end wall, and/or a fiber optic penetrator arranged in an opening of the second end wall. In other configurations, only a single end wall having two penetrators may be provided, or one penetrator may provide both an electrical and optical connection into the chamber.

In an embodiment, the opening in the respective end wall may have a smaller diameter towards the chamber and a larger diameter towards the termination assembly, and may have a step or shoulder between these different diameters. The penetrator may bear against such step or shoulder, and a compression seal may be achieved by screwing a threaded ring into an inner thread of the opening to press the penetrator against this step or shoulder. One or two O-rings, for example elastomeric and/or metal O-rings, may be provided for sealing.

As an example, a fiber optic penetrator as described in the document U.S. Pat. No. 8,634,690 B2, the contents of which is incorporated herein by reference in its entirety, may be used.

The electrical penetrator may comprise pins sealed in a penetrator body, and wires for providing an electrical connection to the at least one electrical data line of the first subsea cable section may be attached to the pins of the electrical penetrator. As an example, the wires may be soldered thereto. In some embodiments, the wires may be different from the wires within the first cable section that provide the electrical data line, i.e. an intervening element (intervening wires) may be provided. In other embodiments, the wires may be the wires of the electrical data line, i.e. the wires of the electrical data line may be soldered directly to the pins of the electrical penetrator.

The fiber optic penetrator may comprise optical fiber sections sealed in a penetrator body, for example via a glass material, such as cast glass material. An optical fiber of the at least one fiber optic data line may be attached, in particular via a fusion splice, to a fiber section of the fiber optic penetrator. Other possibilities of connecting a fiber of the fiber optic data line to a fiber section of the fiber optic penetrator may be employed. As an example, pigtail connectors may be employed in the fiber optic penetrator, and a respective connection may be made to the optical fiber of the fiber optic data line, which may be fusion spliced to a complementary pigtail connector.

In an embodiment, the subsea housing comprises an outer cylindrical shell and an insert. The insert may include a first end wall, a second end wall and a connecting member that mechanically connects the first end wall to the second end wall. The chamber may be located between the first and second end walls. The insert may be disposed inside the outer cylindrical shell and the first, the second or both end walls may be sealed against an inner surface of the outer cylindrical shell. A compact and reliable configuration of the intermediate conversion assembly may thus be achieved. The connecting member may for example be provided as two rods mounted to the first and second end walls, or formed integrally therewith.

The chamber may be sealed by a compression seal towards an inner surface of an outer cylindrical shell of the subsea housing. As an example, the compression seal may comprise at least two O-rings that are compressed between the outer diameter of an end wall and the inner surface of the outer cylindrical shell. In another embodiment, an annulus or a cap may engage the cylindrical shell via an inner or outer threat, or another fixing device, and may compress a seal against the inner surface of the cylindrical shell and/or against for example an end wall of the above mentioned insert.

According to a further embodiment of the invention, a subsea data transmission cable for providing data communication with a subsea device installed at the ocean floor is provided. The subsea data transmission cable comprises a first subsea cable section comprising at least one electrical data line, a second subsea cable section comprising at least one fiber optic data line, and an intermediate conversion assembly. The at least one electrical data line and the at least one fiber optic data line are terminated to the intermediate conversion assembly. At least one of the first subsea cable section and the second subsea cable section is provided by a liquid filled hose that is pressure compensated against the ambient environment, for example by a pressure balanced oil filled (PBOF) hose.

The intermediate conversion assembly comprises a chamber sealed to the environment outside the subsea data transmission cable, the chamber being filled with a liquid, an electrical feedthrough for leading an electrical connection to the at least one electrical data line into the chamber and an optical feedthrough for leading an optical connection to the at least one fiber optic data line into the chamber. A conversion device is disposed in the chamber. The conversion device has an electrical interface to which the at least one electrical data line is connected and an optical interface to which the at least one fiber optic data line is connected. The conversion device is configured to convert an electrical data signal received at the electrical interface to an optical data signal for transmission via the optical interface, and to convert an optical data signal received at the optical interface to an electrical data signal for transmission via the electrical interface.

The intermediate conversion assembly further comprises a pressure equalizing component that provides a pressure balancing between the inside of the chamber and the inside of the liquid filled hose, so that when the subsea data transmission cable is deployed subsea, the pressure applied by the ambient environment to the liquid filled hose is transmitted via the pressure equalizing component into the chamber.

By way of such subsea data transmission cable, advantages similar to the ones outlined further above may be achieved. Furthermore, such subsea data transmission cable may achieve a reduced complexity, since the chamber is pressure balanced against the inside of the liquid filled hose, so that the electrical and/or optical feedthrough into the chamber can be kept relatively simple. There may not even be a seal required between the inside of the liquid filled hose and the inside of the chamber. Furthermore, the structure providing the chamber can be compact and light weight, since the differential pressure between the inside of the chamber and the inside of the oil filled hose or the subsea environment is negligible.

According to an embodiment, the pressure equalizing component is a flow connection between the inside of the liquid filled hose and the chamber. Accordingly, the liquid filling the chamber and the hose may flow through such flow connection, thereby equalizing the pressure and providing compensation for volume changes of the liquid, for example due to temperature and/or pressure changes. A simple and cost effective configuration may thus be achieved.

According to a further embodiment, the pressure equalizing component comprises a volume compensating element. As an example, such volume compensating element may comprise a piston, a bladder, a membrane, a bellows, or more or a combination of such elements. By way of such volume compensating element, the pressure between the inside of the chamber and the inside of the liquid filled hose can be balanced. Furthermore, volume variations of the liquid filling the chamber can be accommodated by a respective deformation of the volume compensating element. Furthermore a flow of liquid from the hose into the chamber may be prevented by providing such volume compensating element, so that upon seawater ingress into the hose or upon occurrence of pollution of the liquid filling the hose, such deteriorated liquid cannot enter the chamber.

In an embodiment, the chamber is provided inside an outer sheath or jacket of the liquid filled hose. A very compact and reliable configuration may thus be achieved.

In another embodiment, the chamber comprises a chamber housing that has one or more openings towards the liquid filled hose for providing the electrical feedthrough and the optical feedthrough. The one or more openings may further provide the pressure equalizing component. A simple and compact configuration may thus be achieved.

The electrical or optical feedthrough may thus be provided by the respective electrical wire or optical fiber passing through the opening without any sealing, and pressure equalization may also occur through such opening. There may be one or more openings towards the first subsea cable section, and one or more openings towards the second subsea cable section provided in the intermediate conversion assembly. In other embodiments, the electrical and/or optical feedthrough may comprise a seal, such as a gland seal, or may comprise a penetrator for preventing the exchange of liquid through the respective opening provided for the feedthrough.

In an embodiment, the first subsea cable section has a length of at least 1 m, preferably at least 1.4 m. As an example, the first subsea cable section may have a length between about 1 m and about 100 m, preferably between about 1 m and about 50 m, more preferably between about 1.4 m and about 30 m.

In an embodiment, the second subsea cable section may have a length of at least 50 m, preferably a length of at least 100 m. In fact, the second subsea cable section may have a length of more than 500 m or even more than 1000 m. The length of the second subsea cable section may only be restricted by the respective fiber optic transmission system employed. The length of the second subsea cable section may be 50 km or more, it may for example have a length of up to 100 km.

In an embodiment, the subsea data transmission cable further comprises a part of a wet mateable subsea connector attached to the other end of the first subsea cable section. In other words, at one end of the first subsea cable section, the intermediate conversion assembly may be provided, and at the other end, a wet mateable subsea connector may be provided.

In other embodiments, the other end of the first subsea cable section may be directly mounted to a subsea device, for example via a respective penetrator which leads the electrical data line directly into the subsea device. As an example, a subsea sensor may be directly attached to the other end of the first subsea cable section.

In an embodiment, the subsea data transmission cable further comprises a second intermediate conversion assembly and a third subsea cable section, in particular a liquid filled hose that is pressure compensated against the ambient environment, the third subsea cable section comprising at least one electrical data line. The other end of the second subsea cable section, i.e. the end that is not connected to the intermediate conversion assembly, is terminated to the second intermediate conversion assembly. The optical data line of the second subsea cable section is connected to the optical interface of the conversion device of the second intermediate conversion assembly. At least the electrical data line of the third subsea cable section is terminated to the second intermediate conversion assembly. In some embodiments, the third subsea cable section may be completely terminated towards the second intermediate conversion assembly, for example by way of one of the above outlined termination assemblies.

By such configuration, a subsea data transmission cable may be achieved that can be connected at both ends with an electrical connection directly to a subsea device, a topside installation, an onshore site or the like. Again, at either side of such subsea data transmission cable, the electrical connection may be provided with a wet mateable or other type of electrical connector, or may be provided directly to the respective subsea device without any intervening connector. Accordingly, such subsea data transmission cable can be used to connect to subsea devices or a subsea device and a topside installation together by the same procedure that are used for conventional electrical communication links, while the data transmission benefits from the increase bandwidth and the increased physical length that can be achieved by making use of the two intermediate conversion assemblies and the fiber optic data transmission line.

The first termination assembly and/or the second termination assembly may comprise a fitting, in particular an MK2 fitting at the respective subsea cable section, and a fitting interface, in particular an MK2 interface at the respective end of the intermediate conversion assembly. In some embodiments, the intermediate conversion assembly may comprise a fitting at one or both ends, and a fitting adaptor may be mounted to such fitting, the fitting adapter providing an interface to the same type of fitting or to a different type of fitting that is provided at the respective subsea cable section. It may in particular provide an interface to an MK2 fitting. By way of such configurations, assembly of the respective subsea cable section and the intermediate conversion assembly may be facilitated.

According to an embodiment, the electrical data line and the fiber optic data line are Ethernet data lines, and the conversion device is configured for the conversion of Ethernet data signals. By making use of Ethernet for data communication, the monitoring, control and communication with subsea devices may be improved.

The at least one electrical data line may comprise lines for at least two separate Ethernet signals, it may for example comprise at least 8 electrical conductors or wires. The electrical penetrator may for example comprise at least 10 pins, 8 for the two separate Ethernet signals, and two pins for leading an electrical connection for providing power to the conversion device into the chamber. The at least one fiber optic data line may comprise lines for providing at least two separate Ethernet signals, it may for example comprise 4 optical lines, in particular four separate optical fibers. The optical penetrator may comprise at least 4 fiber sections for leading optical connections to the at least 4 lines into the chamber.

The subsea data transmission cable may furthermore comprise one or more power lines for transporting electrical power from one end of the subsea data transmission cable to the other end of the subsea data transmission cable. Such electrical power lines may bypass the intermediate conversion assembly or assemblies that are provided in the subsea data transmission cable. In particular, such power lines may not pass through the chamber in which the conversion device is arranged.

If the chamber is filled with a liquid, the liquid is preferably a dielectric liquid, in particular an oil, or an ester based liquid, such as Midel. The hose may be filled with the same liquid or a different liquid.

A further embodiment of the invention relates to an intermediate conversion assembly itself, without the first and second subsea cable sections, having any of the above outlined configurations.

It is to be understood that the features mentioned above and those yet to be explained below can be used not only in the respective combinations indicated, but also in other combinations or in isolation without leaving the scope of the present invention.

FIG. 1 illustrates schematically a subsea data transmission cable 100 according to an embodiment. The subsea data transmission cable 100 comprises a first subsea cable section 10, a second subsea cable section 20 and an intermediate conversion assembly 50 there between. The subsea cable sections 10, 20 can be conventional subsea cables, yet preferably, they are fluid filled hoses, in particular oil filled hoses, that are pressure balanced against the ambient medium. Pressure balancing may occur by the flexibility of the hose, i.e. the hose transmits the pressure to the inside and expands/contracts as the volume of the liquid filling the hose changes. Electrical wires, optical fibers, or electrical conductors for transmitting power can be provided inside the oil filled hose and are thus protected from the subsea environment. Such configuration allows the cable itself to be relatively flexible and cost efficient to produce. In some embodiments, both the first and second subsea cable sections 10, 20 are oil filled hoses, or conventional subsea cables with a solid filling, while in other embodiments, one cable section may be a conventional subsea cable and the other cable section may be an oil filled hose.

In the example of FIG. 1, the first subsea cable section 10 is at one end 11 terminated at the intermediate conversion assembly 50. At the other end 12, a wet mateable subsea connector 41 is provided. The first subsea cable section has a length d1. The length d1 may for example be more than 1 m, in particular between about 1 m and 100 m, or about 1.4 m to about 30 m. As an example, it may be 1.5 m.

The second subsea cable section 20 is at one end 21 terminated at the intermediate conversion assembly 50. The second subsea cable section 20 has a length d2. The length d2 may be more than 100 m, it may be even more than 500 m or 1000 m. As an example, it may be up to 100 km. At its other end, the second subsea cable section 20 may be connected to a topside facility, for example onboard an offshore platform or at an on shore site, it may be terminated to another intermediate conversion assembly, or it may be terminated directly to another subsea device, such as a subsea control module or the like.

The first subsea cable section 10 comprises at least one electrical data line, and the second subsea cable section 20 comprises at least one fiber optic data line. The intermediate conversion assembly 50 comprises a chamber in which a conversion device is provided that converts an electrical data signal received on the electrical data line to an optical signal for transmission on the optical data line and vice versa. Preferably, the subsea data transmission cable 100 is configured for the transmission of Ethernet data signals. Accordingly, by way of such configuration, an electrical wet mateable connector 41 of conventional type which is less complex and more cost efficient than comparable optical wet mateable connectors can be used. Furthermore, due to the use of the conversion assembly 50 and the fiber optic data line, Ethernet communication over significant distances can be achieved. By way of the subsea data transmission cable 100, a subsea Ethernet communication link may be provided between two subsea installations that are located a significant distance from each other, for example more than 100 m or even more than 1,000 m, or an Ethernet communication link may be provided to a topside facility which may be located several km or even up to 100 km away from the subsea installation.

Furthermore, the wet mateable subsea connector 41 can be kept relatively compact and lightweight so that it is easy to handle for an ROV. Also, damage to the connector or components thereof due to added weight can be prevented. Furthermore, by providing the intermediate conversion assembly 50 separate from the wet mateable connector 41, the transmission of vibrations and the like from a subsea device to which the connector 41 is connected to the conversion assembly 50 can be prevented, thus also reducing the probability of damage to the conversion assembly 50 and increasing its reliability and lifetime. The use of a fluid filled hose is particularly beneficial in this respect as the mechanical force applied to the connector and the transmission of vibrations may be further reduced due to its higher flexibility.

Figure 2:
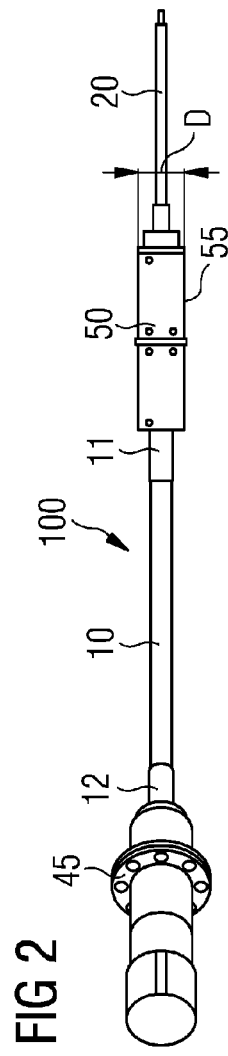
FIG. 2 is a schematic drawing showing a subsea data transmission cable according to a further embodiment of the invention.

FIG. 2 is a schematic diagram showing a further embodiment of the subsea data transmission cable 100. In the example of FIG. 2, the second subsea cable section 20 is provided in form of a conventional, solid subsea cable, in particular fiber optic subsea cable. The first subsea cable section 10 is provided in form of an oil filled hose. In such configuration, the subsea data transmission cable 100 may have a significant total length, for example exceeding 1 km, while the portion of the cable that is close to the subsea device towards which the cable is mounted is relatively flexible and can be terminated reliably due to the provision of the pressure compensation by the flexible hose. Furthermore, the second end 12 of the first cable section 10 is provided with a feedthrough assembly 45 having a flange for connection to the housing of a subsea device, so that the subsea data transmission cable is directly mounted to the subsea device without any intervening wet mateable connector.

As can be seen in FIG. 2, the subsea housing 55 has an outer diameter D. Preferably, this diameter D is relatively small. In particular, it may be smaller than three times the diameter of a connected oil filled hose and preferably even smaller than two times the diameter of such oil filled hose providing the first subsea cable section.

Figure 3:
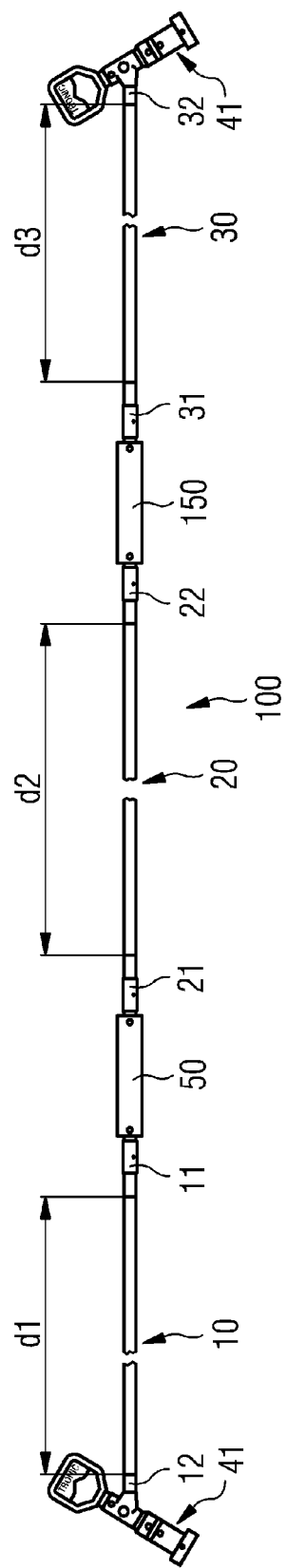
FIG. 3 is a schematic drawing showing a subsea data transmission cable according to a further embodiment of the invention.

FIG. 3 illustrates a further embodiment, in which the subsea data transmission cable 100 comprises a second intermediate conversion assembly 150 to which a second end 22 of the second subsea cable section 20 is terminated. It further comprises a third subsea cable section 30 which at one end 31 is terminated to the second intermediate conversion assembly 150 and at the other end 32 a wet mateable electrical connector 41 is mounted. The second intermediate conversion assembly 150 is configured similar to the first intermediate conversion assembly 50. In particular, it may have a conversion device mounted in a chamber inside a subsea housing 55, and the conversion device is connected to the fiber optic data line in the second subsea cable section 20 and to the electrical data line in the third subsea cable section 30. It should be clear that in other configurations, either one of the ends 12, 32 may instead be directly connected to a subsea device, or to a topside installation, or may be connected to a feedthrough assembly 45 or the like.

In example of FIG. 3, the first, second and third subsea cable sections are provided in the form of liquid filled hoses. In other embodiments, one or more of these cable sections may be provided as conventional solid subsea cables, as outlined above. The length d3 of the third subsea cable section may be configured within the same ranges as outlined above for the first subsea cable section 10, i.e. it may for example have a length between about 1 m and about 100 m, for example between about 1.4 m and about 30 m.

The subsea data transmission cable 100 may be provided as a cable having only fittings at the ends 12, 22 of the first and second cable sections 10, 20 or at the ends 12, 32 of the first and third cable sections 10, 30. In other configurations, it may include the respective feedthrough assemblies or wet mateable connectors.

Figure 4:
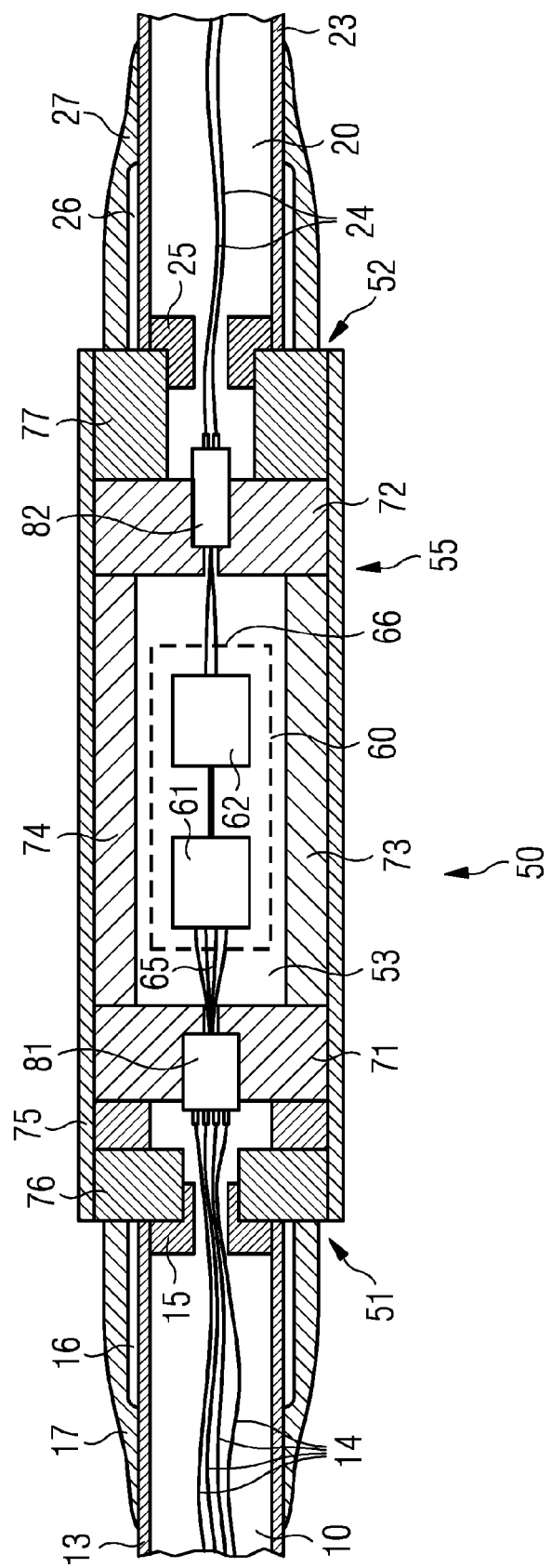
FIG. 4 is a schematic drawing showing a sectional side view of an intermediate conversion assembly according to an embodiment of the invention.

FIG. 4 illustrates an embodiment of the intermediate conversion assembly 50 which can be used with any of the above outlined configurations of the subsea data transmission cable 100. The intermediate conversion assembly 50 has a subsea housing 55 and a sealed chamber 53 provided inside the subsea housing. The conversion device 60 is arranged inside the sealed chamber 53. At one end of the subsea housing 55, the intermediate conversion assembly 50 comprises a first termination assembly 51 which terminates the first subsea cable section 10. On its other end, it comprises the second termination assembly 52 which terminates the second subsea cable section 20. Both cable sections 10, 20 are provided in the form of oil filled hoses having an outer sheath or jacket 13, 23 formed by the flexible hose. Electrical wires providing at least one electrical data line 14 are disposed in the first subsea cable section 10. One or more optical fibers providing at least one fiber optic data line 24 are disposed in the second subsea cable section 20. The wires are insulated and can be provided with an additional jacket, and they may be free floating or fixed within the hose 13. Similarly, the optical fibers may be bundled and may be free floating or fixed within the hose 23. Additional conductors can be provided in both hoses 13, 23, for example for the transport of electrical power.

The first termination assembly 51 has a fitting 15, a crimp sleeve 16 which is crimped onto the hose 13, and a bend restrictor 17. Similarly, the second termination assembly 52 has a fitting 25, a crimp sleeve 26 crimped onto the hose 23 and a bend restrictor 27. It should be clear that the respective termination assemblies may comprise further components that are not illustrated in FIG. 4 for the purpose of a clear and comprehensive presentation. Examples are an insert and a nut for clamping the end of the hose, a wire fixture for holding the wires, a fill or vent port for filling the hose with the liquid, and the like. The fittings 15, 25 may for example have an MK2-interface.

In the example of FIG. 4, the subsea housing 45 includes an outer cylindrical shell 75 and an insert that comprises a first end wall 71, a second end wall 72 and a mechanical connecting member 73, 74. The connecting member 73, 74 may be a single element, such as a circumferentially extending sleeve that provides a separation between the end walls 71, 72. In other configurations, separate elements may be provided as a connecting member for providing such spacing, for example separate rods. One or both elements of such connecting member 73, 74 may be formed integrally with the end walls 71, 72 as illustrated for example in FIG. 7 (in which the insert is marked with reference numeral 70).

The end walls 71, 72 can be sealed against an inner surface of the outer cylindrical shell 75, thereby forming the sealed chamber 53 there between. Sealing may be provided by respective O-ring seals or compression seals. As an example, the subsea enclosure 55 may be provided with a first end cap 76, which may be fixed inside the outer shell 75, for example by an internal thread, or by bolds reaching through the shell 75 into the end cap 76. A second end cap 77 may be fixed correspondingly or may be screwed into the outer cylindrical shell 75, for example by making use of respective bolts or of an internal thread in the shell 75. The seals may be compressed between the respective end wall 71, 72 and the inside of the outer cylindrical shell 75, or may in other configurations compressed axially against a shoulder or the like. An effective pressure tight sealing is thus achieved. Further seals are be provided between each end cap 76, 77 and the inner surface of the cylindrical outer shell 75. The space between the end wall 71, 72 and the respective end cap 76, 77 can be filled with the liquid, in particular oil, of the respective connected hose.

For leading an electrical connection to the electrical data line 14 and an optical connection to the fiber optic data line 24 into the chamber 53, a penetrator assembly is provided. The penetrator assembly comprises the electrical penetrator 81. Penetrator 81 comprises pins that are sealed in a penetrator body. The penetrator body is housed in a recess inside the first end wall 71. Wires of the electrical data line 14 are connected directly or indirectly to the pins of the electrical penetrator 81. On the other side, an electrical connection is provided from the pins of the penetrator 81 to an electrical interface 65 of the conversion device 60. The penetrator 81 may be sealed in the recess provided in end wall 71 in a manner similar to a compression fitting, for example via a seal that is compressed by a nut that is screwed into an inner thread in the recess.

The fiber optic penetrator 82 may be mounted in a similar way in a recess in the second end wall 72. Optical fiber sections may be sealed in through holes of a penetrator body by a glass material for providing a hermetic seal that can withstand significant pressure differences. The fiber sections may then be connected to the optical fibers of the fiber optic data line 24 via fusion splicing, or respective pigtail connectors may be used that are fusions spliced to the ends of the optical fibers of the fiber optic data line 24.

Inside the chamber 53, the optical fiber sections are connected to an optical interface 66 of the conversion in device 60. It is noted that these interfaces and the conversion device 60 itself are only sketched schematically in the drawing of FIG. 4. The conversion device 60 may for example comprise an Ethernet chipset 61 for processing and converting Ethernet signals, and further comprises an electrical to optical signal converter 62, which operates in both directions i.e. it is configured to convert an electrical signal into an optical signal and an optical signal into an electrical signal.

Accordingly, when an optical data signal arrives via the fiber optic data line 24, it is converted into an electrical signal by the electro optical converter 62 and is than processed and transmitted by the Ethernet chipset 61 on the electrical data line, and vice versa.

As an example, the subsea data transmission cable provides two separate Ethernet links. For each Ethernet link, four wires may be provided in the electrical data line 14. Furthermore, two electrical wires for providing a power supply to the conversion device 60 are provided for example in the first subsea cable section 10. Accordingly, the electrical penetrator 81 may comprise 10 pins, four for each Ethernet link, and two for leading the electric power connection into the chamber 53. For the two separate Ethernet signals, four optical fibers may be used. Accordingly, the optical penetrator 82 may comprise four sections of optical fiber.

As mentioned above, the first and second subsea cable sections 10, 20 may each comprise additional conductors for transporting electric power. These may bypass the chamber 53 of the intermediate conversion assembly 50. As an example, in a configuration where the end walls 71, 72 and the connecting members 73 are formed integrally, a hole may be provided through such integral insert 70, through which the electric power conductors can be led. Such through connection through the insert 70 would not have any connection into the chamber 53 and would thus be sealed hermetically therefrom.

Figure 7:
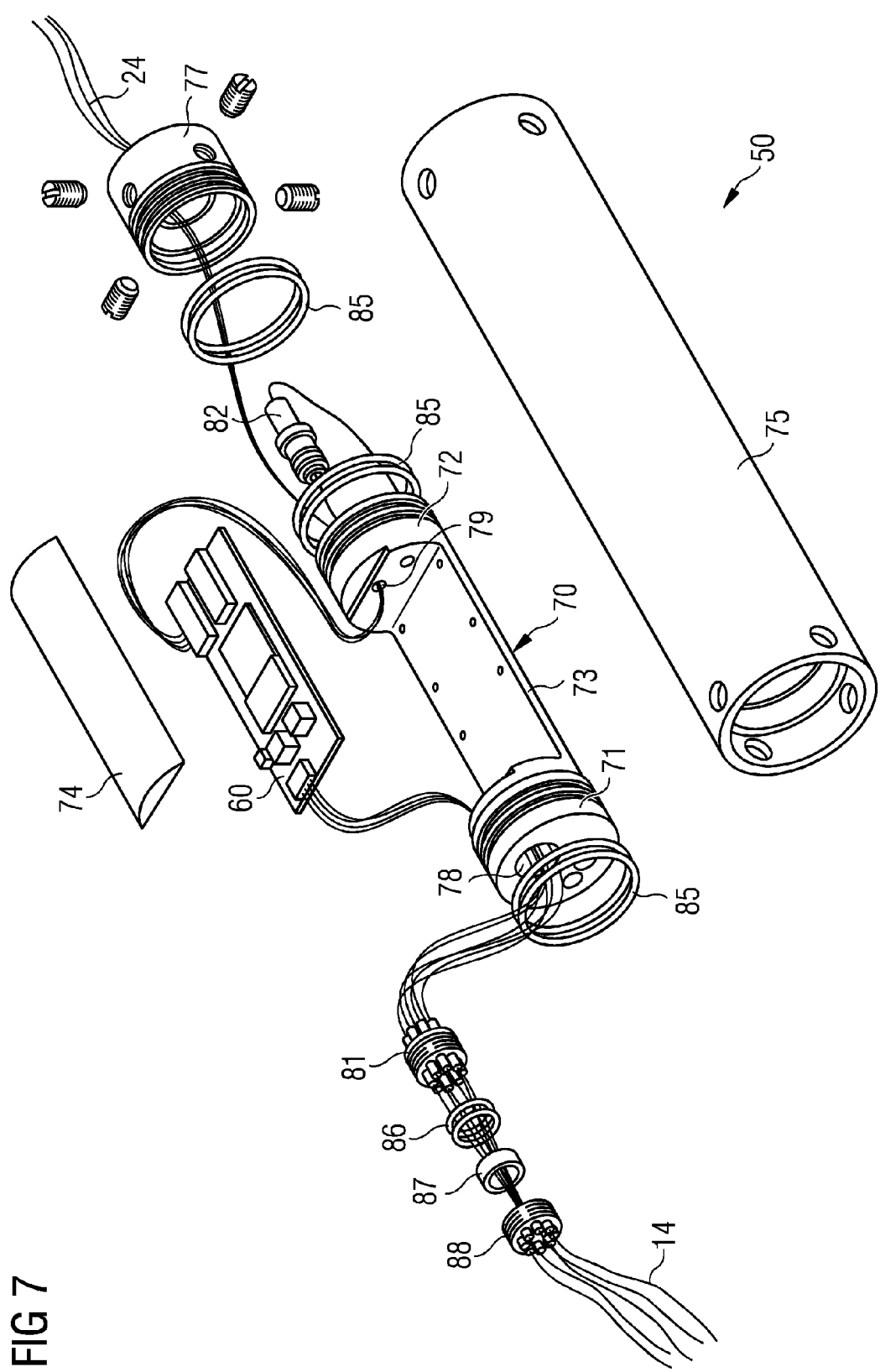
FIG. 7 is a schematic drawing showing a perspective exploded view of an intermediate conversion assembly according to a further embodiment.

Note that the converter device 60 can be provided in any other configuration, as long as it is capable of performing the conversion of the electrical signals received on the electrical data line 14 to an optical signal for transmission on the optic data line 24 and vice versa. The conversion device 60 may comprise respective circuits and components mounted to a common circuit board as illustrated in FIG. 7. As outlined above, in operation, it is thus possible to connect the first subsea cable section 10 with an electrical interface to a subsea device, and transmit an Ethernet signal over significant distances exceeding 100 m.

FIG. 5 illustrates a further embodiment of the intermediate conversion assembly 50. The intermediate conversion assembly 50 again comprises a first and a second termination assembly 51, 52 which can be configured similar to the one describe with respect to FIG. 4. The subsea housing 55 comprises the outer shell 75 and end caps 76, 77. In the example of FIG. 5, no insert 70 is provided, but the chamber 53 is formed directly in the subsea housing 55, the end caps 76, 77 forming end walls of the chamber. The chamber 53 is filled with a liquid, in particular with an oil. The intermediate conversion assembly 50 has an electrical feedthrough 91 and an optical feedthrough 92. These are provided simply by openings or passages in the subsea housing 55 through which the electrical connection and the fiber optic connection are led into the chamber 53. The electrical wires providing the electric data line 14 may be led directly into the chamber 53, or may be terminated at an intermediate piece from which the electrical connections are led into the chamber. Similarly, the optical fibers of the second subsea cable section 20 may be led directly through the optical feedthrough 92 into the chamber 53, or indirectly, for example via pigtail connectors or the like.

The intermediate conversion assembly 50 further comprises a pressure equalizing component. In the example of FIG. 5, the pressure equalizing component is provided by a flow connection in form of the passage of the electrical feedthrough 91 and the optical feedthrough 92. The pressure equalizing component provides a pressure balancing between the inside of the chamber 53 and the inside of the liquid filled hose of the first and/or second cable section 10, 20. In the example of FIG. 5, this pressure equalization is provided by allowing the liquid to flow freely through the passage between the inside of the respective hose and the inside of chamber 53. Due to the flexibility of the hose, the inside of the hose is pressure balanced against the subsea environment, so that the hose also provides pressure balancing for the interior of chamber 53. A relatively simple and robust configuration of the intermediate conversion assembly 50 can thus be achieved which does not require any additional pressure compensator.

In other configurations, the electrical and optical feedthroughs 91, 92 may be sealed, for example via a gland seal or by using a penetrator as outlined with respect to FIG. 4. The pressure equalizing component may comprise an additional opening between the inside of the respective hose 14, 24, through which liquid can flow between the hose and the chamber 53. In other configurations, the pressure equalizing component may comprise a volume compensating element such as a piston, a bladder, a membrane or a bellows. Such volume compensation element may be provided over such opening, so that the liquid inside the chamber 53 is separated from the liquid inside the respective hose 13, 24. The entering of debris into the chamber 53 may thus be prevented and protection against seawater ingress may be improved.

Operation of the intermediate conversion assembly 50 is similar as described with respect to FIG. 4. Furthermore, as can be seen from FIG. 5, additional electrical conductors for providing power transmission can be led simply through the chamber 53.

FIG. 6 illustrates a further embodiment of the intermediate conversion assembly 50. In the embodiment of FIG. 6, no subsea housing is provided, but the chamber 53 is provided directly inside the liquid filled hose. The liquid filled hose may thus not need to be terminated. Again, the electrical and optical feedthroughs 91, 92 are provided by wires or optical fibers reaching through respective openings or passages in the chamber 53. Additional conductors for providing electric power transmission may be led past the chamber 53. The configuration of FIG. 6 achieves a very compact and reliable intermediate conversion assembly. Since no housings and additional interfaces or terminations are provided, the chance of seawater ingress is reduced. As outlined above, the electrical and optical feedthroughs 91, 92 may be sealed in other configurations. For the pressure equalizing component, a dedicated opening can be provided, or it may again comprise at least one of a piston, a bladder, a membrane or a bellows.

FIG. 7 is a schematic drawing illustrating an exploded view of a further embodiment of the intermediate conversion assembly 50. The insert 70 comprises the first and second end walls 71, 72 and the connecting member 73 which are formed integrally as a single piece, and the further connecting member 74 which can be removed for mounting the conversion device 60. Seals 85 are provided for sealing the end walls 71, 72 to the inner surface of the outer cylindrical shell 75. The electrical penetrator 81 is sealed in the opening 78 in the first end wall 71 by way of a compression seal formed by the O-rings 86, the sleeve 87 and the nut 88. The second end cap 77 is fixed inside the outer cylindrical body 75 by grub screws, and the first end cap 76 (not shown in FIG. 7) may be fixed similarly. A robust and reliable intermediate conversion assembly 50 can thus be achieved.

As illustrated, the wires of the electrical data line are not directly but indirectly attached to the pins of the electrical penetrator 81. Furthermore, the optical fibers of the fiber optic date line 24 may be routed through openings in the insert 70 for providing strain relief.

In the embodiments of FIG. 4 and FIG. 7, the chamber 53 is a pressure resistant chamber that maintains a predefined internal pressure. The pressure may for example be below 5 bar, e.g. about 1.5 bar or about atmospheric pressure. The chamber 53 may be filled with a gas, such as air or nitrogen or the like. In contrast, the chamber 53 of FIGS. 5 and 6 is oil filled and maintained at ambient pressure, i.e. it is pressure balanced against the ambient subsea environment when deployed subsea via the respective pressure equalizing component and the liquid filled hose.

Figure 8:
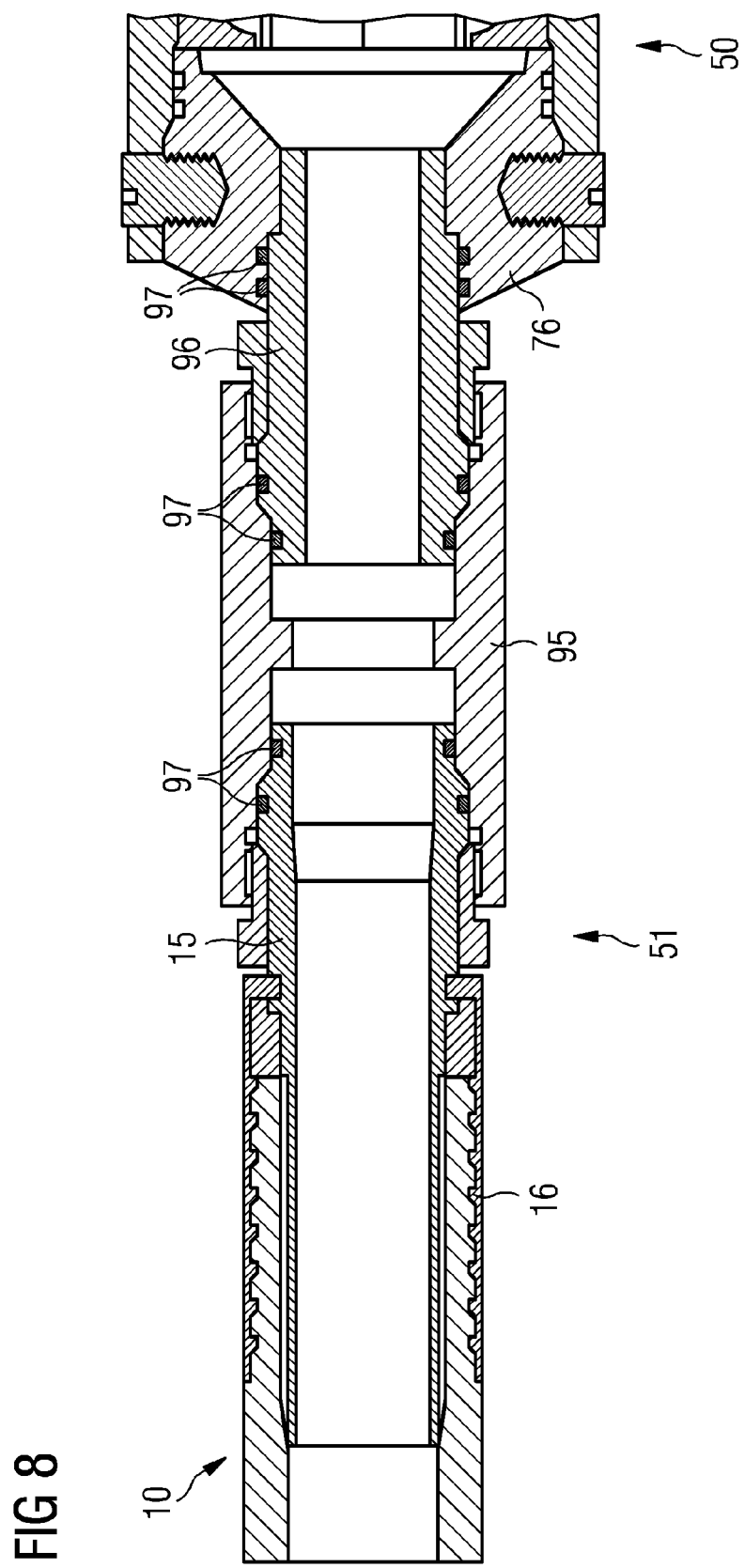
FIG. 8 is a schematic drawing showing a sectional side view of an fittings provided for mounting a subsea cable section to an intermediate conversion assembly according to an embodiment of the invention.

FIG. 8 illustrates how the first or second subsea cable section 10, 20 may be terminated at the intermediate conversion assembly 50 in any of the above embodiments. The first termination assembly 50 comprises again a crimp sleeve 16 and a fitting 15, e.g. MK2. In the end cap 76, a similar or a different type of fitting 96 is provided. By way of the fitting adaptor 95, the two fittings 15, 96 are connected together. A passage is thus formed and sealed by the seals 97 through which the electrical data line 14 can pass. The configuration can be similar for the second termination assembly 52.

The components shown in FIGS. 7 and 8 are to scale with each other in some embodiments of the invention. It should be noted that they can be sized differently in other embodiments.

It should be clear that the above described configurations of the intermediated conversion assembly 50 can be used in any of the configurations of the subsea data transmission cable 100 describes with respect to FIGS. 1, 2 and 3. It is noted, that two respective intermediate conversion assemblies can be provided on the subsea data transmission cable 100 for providing an electrical to optical and optical to electrical conversion. It should also be clear that for example the configuration of FIG. 5 can not only be used with two liquid filled hoses, but may as well be used with only one liquid filled hose and one conventional solid subsea cable. Similarly, the configuration of FIG. 4 may be used with one or two conventional solid subsea cables instead of the oil filled hoses 13, 23.

The features described above with the respect to the different configurations and embodiments can be combined with each other unless noted to the contrary.

While specific embodiments are disclosed herein, various changes and modifications can be made without departing from the scope of the invention. The present embodiments are to be considered and all respects as illustrate and non-restrictive, and all changes coming within the meaning and equivalency range of the appended claims are intended to be embraced therein.

The aforementioned description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure and appended claims.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one embodiment of the invention relates to a non-transitory computer-readable storage medium comprising electronically readable control information stored thereon, configured in such that when the storage medium is used in a controller of a magnetic resonance device, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A subsea data transmission cable for providing data communication with a subsea device installed at the ocean floor, comprising:
    a first subsea cable section comprising at least one electrical data line;
    a second subsea cable section comprising at least one fiber optic data line; and
    an intermediate conversion assembly, wherein one end of the first subsea cable section is terminated at the intermediate conversion assembly and wherein one end of the second subsea cable section is terminated at the intermediate conversion assembly, the intermediate conversion assembly including
        a subsea housing,
        a sealed chamber provided in the subsea housing,
        a first termination assembly to terminate at least an outer sheath of the first subsea cable section,
        a second termination assembly to terminate at least an outer sheath of the second subsea cable section,
        a penetrator assembly configured to provide an electrical connection from within the sealed chamber to the at least one electrical data line and to provide an optical connection from within the sealed chamber to the at least one fiber optic data line, and
        a conversion device disposed in the sealed chamber, the conversion device including an electrical interface to which the at least one electrical data line is connected and including an optical interface to which the at least one fiber optic data line is connected, wherein the conversion device is configured to convert an electrical data signal received at the electrical interface to an optical data signal for transmission via the optical interface, and to convert an optical data signal received at the optical interface to an electrical data signal for transmission via the electrical interface.

2. The subsea data transmission cable of claim 1, wherein the chamber is a pressure resistant chamber configured to maintain an internal pressure inside the chamber when the subsea data transmission cable is deployed subsea.

3. The subsea data transmission cable of claim 1, wherein the chamber includes a first end wall towards the first termination assembly and a second end wall towards the second termination assembly, and wherein the penetrator assembly comprises at least one of an electrical penetrator arranged in an opening of the first end wall and an fiber-optic penetrator arranged in an opening of the second end wall.

4. The subsea data transmission cable of claim 3, wherein the electrical penetrator comprises pins sealed in a penetrator body, and wherein wires for providing an electrical connection to the at least one electrical data line of the first subsea cable section are attached to the pins of the electrical penetrator.

5. The subsea data transmission cable of claim 3, wherein the fiber-optic penetrator comprises optical fiber sections sealed in a penetrator body, and wherein an optical fiber of the at least one fiber optic data line is attached to a fiber section of the fiber-optic penetrator.

6. The subsea data transmission cable of claim 1, wherein the subsea housing comprises an outer cylindrical shell and an insert, wherein the insert includes a first end wall, a second end wall and a connecting member to mechanically connect the first end wall to the second end wall, the chamber being located between the first and second end walls, and wherein the insert is disposed inside the outer cylindrical shell and the first, the second or both end walls are sealed against an inner surface of the outer cylindrical shell.

7. The subsea data transmission cable of claim 1, wherein the chamber is sealed by a compression seal towards an inner surface of an outer cylindrical shell of the subsea housing.

8. The subsea data transmission cable of claim 1, wherein the first subsea cable section is a liquid filled hose that is pressure compensated against the ambient environment and wherein the second subsea cable section is a liquid filled hose that is pressure compensated against the ambient environment.

9. The subsea data transmission cable of claim 2, wherein the chamber is a pressure resistant chamber configured to maintain the internal pressure below 5 bar.

10. The subsea data transmission cable of claim 2, wherein the chamber includes a first end wall towards the first termination assembly and a second end wall towards the second termination assembly, and wherein the penetrator assembly comprises at least one of an electrical penetrator arranged in an opening of the first end wall and an fiber-optic penetrator arranged in an opening of the second end wall.

11. The subsea data transmission cable of claim 1, further comprising a part of a wet-mateable subsea connector attached to the other end of the first subsea cable section.

12. The subsea data transmission cable of claim 1, further comprising
a second intermediate conversion assembly, and
a third subsea cable section comprising at least one electrical data line, wherein at least the optical data line is terminated at the second intermediate cable termination assembly, said optical data line being connected to the optical interface of the conversion device of the second intermediate conversion assembly, and wherein at least the electrical data line of the third subsea cable section is terminated at the second intermediate conversion assembly.

13. A subsea data transmission cable for providing data communication with a subsea device installed at the ocean floor, comprising:
a first subsea cable section including at least one electrical data line;
a second subsea cable section including at least one fiber optic data line; and
an intermediate conversion assembly, wherein the at least one electrical data line and the at least one fiber optic data line are terminated to the intermediate conversion assembly, wherein at least one of the first subsea cable section and the second subsea cable section is provided by a liquid filled hose that is pressure compensated against the ambient environment, and wherein the intermediate conversion assembly includes:
a chamber sealed to the environment outside the subsea data transmission cable, wherein the chamber is filled with a liquid,
an electrical feedthrough for leading an electrical connection to the at least one electrical data line into the chamber and an optical feedthrough for leading an optical connection to the at least one fiber optic data line into the chamber,
a conversion device disposed in the chamber, the conversion device including an electrical interface to which the at least one electrical data line is connected and including an optical interface to which the at least one fiber optic data line is connected,
wherein the conversion device is configured to convert an electrical data signal received at the electrical interface to an optical data signal for transmission via the optical interface, and to convert an optical data signal received at the optical interface to an electrical data signal for transmission via the electrical interface, and
a pressure equalizing component to provide a pressure balancing between the inside of the chamber and the inside of the liquid filled hose, so that when the subsea data transmission cable is deployed subsea, the pressure applied by the ambient environment to the liquid filled hose is transmitted via the pressure equalizing component into the chamber.

14. The subsea data transmission cable of claim 13, wherein the pressure equalizing component is a flow connection between the inside of the liquid filled hose and the chamber.

15. The subsea data transmission cable of claim 13, wherein the pressure equalizing component comprises a volume compensating element.

16. The subsea data transmission cable of claim 13, wherein the chamber is provided inside an outer sheath or jacket of the liquid filled hose.

17. The subsea data transmission cable of claim 13, wherein the chamber comprises a chamber housing having one or more openings towards the liquid filled hose for providing said electrical feedthrough and said optical feedthrough, and wherein the one or more openings further provide said pressure equalizing component.

18. The subsea data transmission cable of claim 13, wherein the first subsea cable section includes a length of at least 1 m.

19. The subsea data transmission cable of claim 13, further comprising a part of a wet-mateable subsea connector attached to the other end of the first subsea cable section.

20. The subsea data transmission cable of claim 13, further comprising
a second intermediate conversion assembly, and
a third subsea cable section comprising at least one electrical data line, wherein at least the optical data line is terminated at the second intermediate cable termination assembly, said optical data line being connected to the optical interface of the conversion device of the second intermediate conversion assembly, and wherein at least the electrical data line of the third subsea cable section is terminated at the second intermediate conversion assembly.

21. The subsea data transmission cable of claim 10, wherein the volume compensating element includes at least one volume compensating element selected from the group comprising a piston, a bladder, a membrane or a bellows.

22. The subsea data transmission cable of claim 14, wherein the pressure equalizing component comprises a volume compensating element.

23. The subsea data transmission cable of claim 22, wherein the volume compensating element includes at least one volume compensating element selected from the group comprising a piston, a bladder, a membrane or a bellows.

24. The subsea data transmission cable of claim 13, wherein the first subsea cable section includes a length of at least least 1.4 m.

25. The subsea data transmission cable of claim 13, wherein the first subsea cable section includes a length between 1 m and 100 m.

* * * * *